(No Model.)  2 Sheets—Sheet 1.

A. C. COLLINS.
POTATO DIGGER.

No. 369,501. Patented Sept. 6, 1887.

WITNESSES:
Chas. Nida
C. Sedgwick

INVENTOR:
A. C. Collins
BY Munn & Co.
ATTORNEYS.

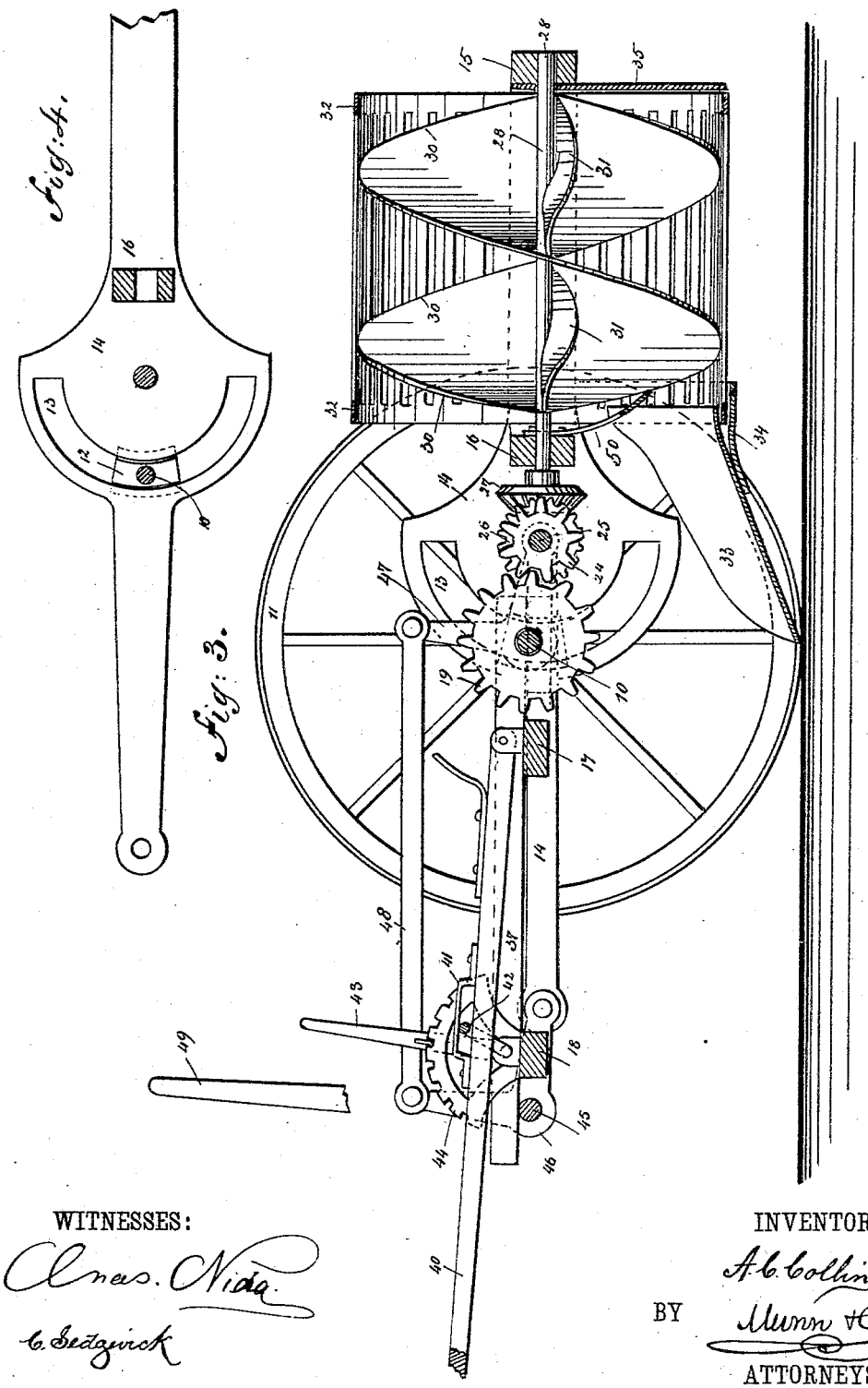

UNITED STATES PATENT OFFICE.

ASA C. COLLINS, OF DRIFTWOOD, PENNSYLVANIA.

POTATO-DIGGER.

SPECIFICATION forming part of Letters Patent No. 369,501, dated September 6, 1887.

Application filed May 4, 1887. Serial No. 237,072. (No model.)

*To all whom it may concern:*

Be it known that I, ASA C. COLLINS, of Driftwood, in the county of Cameron and State of Pennsylvania, have invented a new and Improved Potato-Digger, of which the following is a full, clear, and exact description.

This invention relates to a novel form of potato-digger, the object of the invention being to provide a machine arranged so that it may be drawn by two draft-animals, the row from which the potatoes are to be dug being between the animals, and the machine being so constructed that it may be adjusted so as to operate properly, irrespective of the contour of the ground over which it is being drawn.

Reference is to be had to the accompanying drawings, forming a part of this specification, in which similar figures of reference indicate corresponding parts in all the views.

Figure 2:
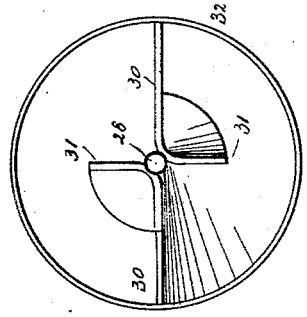
Figure 1:
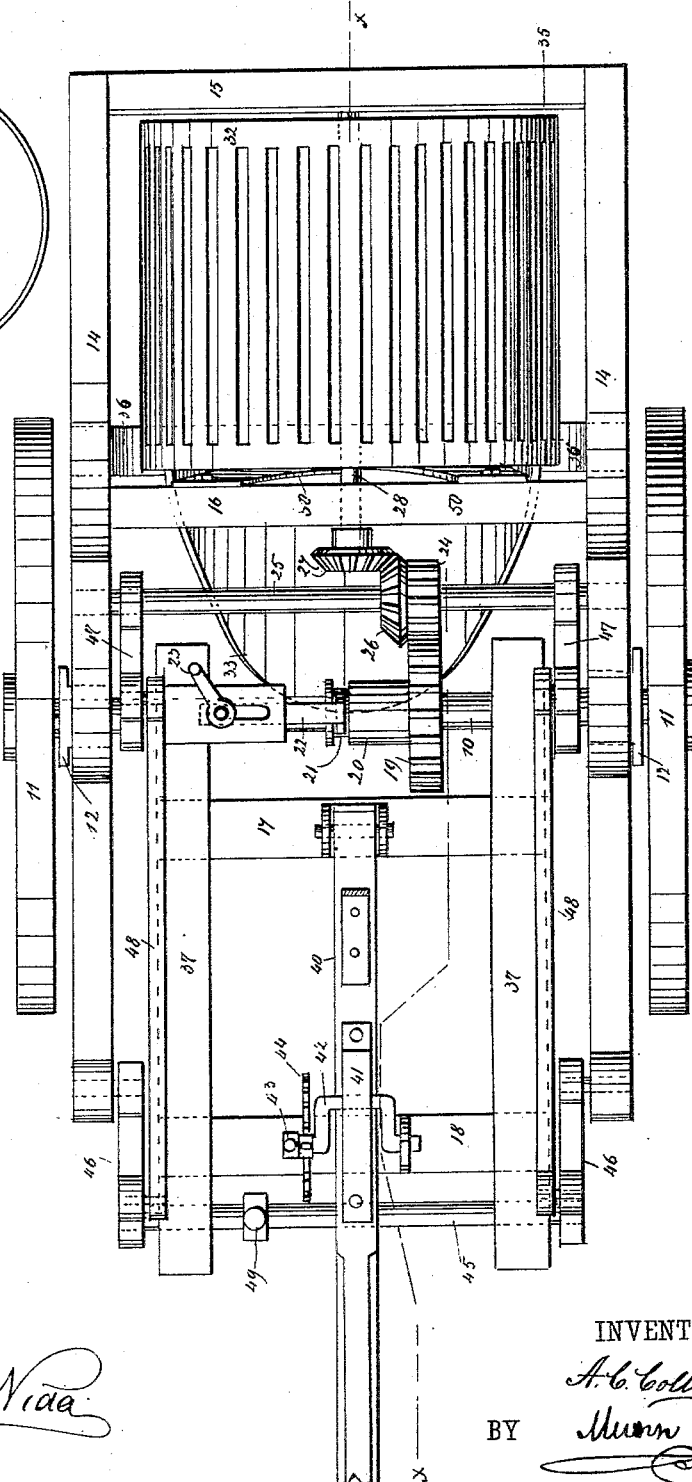

Figure 1 is a plan view of my improved form of potato-digger. Fig. 2 is a view of the forward end of the drum, said drum being represented upon a reduced scale. Fig. 3 is a longitudinal sectional view taken on the broken line *x x* of Fig. 1, and Fig. 4 is a detail view illustrating the construction of one of the side arms of the tilting frame upon which the pole or tongue and the potato-delivering drum are mounted.

In the drawings, 10 represents the main axle of the machine, to which axle the wheels 11 are rigidly connected. This axle 10 passes through blocks or bearings 12, which ride in segmental grooves 13, that are formed in the side pieces, 14, of the main frame of the machine, these side pieces, 14, being united by cross-bars 15 and 16.

The shaft 10 carries a gear, 19, which is mounted to ride on a feather formed upon said shaft, and this gear 19 is formed with a hub, 20, in which there is a groove, 21, said groove being engaged by a slide-bar, 22, that is connected to an operating-lever, 23, the arrangement being such that the gear 19 may be moved forward or backward to engage with a gear, 24, that is loosely mounted on a cross-shaft, 25, said shaft being carried by the side bars, 14. This gear 24 carries a bevel-gear, 26, that engages with a corresponding bevel-gear, 27, carried by a horizontal shaft, 28.

The shaft 28 carries two screw-flanges, 30, each of which flanges extends once about the shaft; and in connection with the flanges 30 I arrange other flanges, 31, which extend outward at right angles from the flanges 30. A cage-like structure, 32, is secured to the edges of the flanges 30, and to the forward end of this cage 32 I connect a scoop, 33, the main body of which projects above and within the cage, while an auxiliary lower flange, 34, that is formed upon the scoop, extends beneath the cage-scoop, being connected to the arms 14 by plates 36, as illustrated, a rear semicircular curtain, 35, being connected to the main frame of the machine and mounted in position to close the lower half of the cage 32.

The shaft 10 carries a forwardly-extending frame, made up of longitudinal strips 37 and cross-strips 17 and 18, and the tongue 40 is hinged to the cross-bar 17, the tongue being provided with a bracket, 41, through which there passes a crank-shaft, 42, said shaft being mounted upon the cross-bar 18, as shown. An operating-lever, 43, is connected to the shaft 42, and a rack, 44, is arranged in connection with the lever.

The forward end of the frame, made up of the longitudinal strips 37 and the cross-bars 17 and 18, is supported by a shaft, 45, that is connected to the arms 14 by bell-crank levers 46, said levers being fulcrumed upon the arms 14. Other bell-crank levers, 47, are mounted upon the shaft 10 and connected to the shaft 25, the upwardly-extending arms of the two sets of levers being connected by rods 48. A lever, 49, is rigidly connected to the shaft or bar 45, and by turning this lever forward or back the bell-crank levers 46 are rocked and a corresponding motion is imparted to the levers 47, which, as they turn upon the shaft 10, will act to raise or lower the side arms, 14, thus raising or lowering the scoop, a proper inclination to said scoop being imparted by raising or lowering the tongue, as will be readily understood from an inspection of the drawings.

Steel clearers 50 are connected to the cross-bar 16, and these clearers are so arranged that they will bear against the edges of the blades 30, acting to cut all weeds and tops therefrom;

but, being made of springy metal, they will yield should they come in contact with any hard obstruction, such as a stone.

In operation the team is attached in the usual manner and the machine started forward. The scoop is adjusted so that it will rest at a proper angle to the ground, and the potatoes and a portion of the dirt by which they are surrounded will be delivered to the cage 32. Then as the spiral blades 30 are revolved the potatoes and the earth will be carried about the shaft 28, being held from falling backward by the blades 31, the loose earth will be sifted out through the openings in the cage 32, and the potatoes will finally be delivered over the rear cross-bar, 15, to any proper receptacle connected to the back of the machine.

Having thus fully described my invention, I claim as new and desire to secure by Letters Patent—

1. In a potato-digger, the combination, with a main shaft, of blocks carried thereby, side arms formed with slots in which the blocks ride, connections between the side arms, a revoluble cage within which there are arranged spiral blades mounted between the arms, a forwardly-extending frame carried by the axle, bell-crank levers carried by the axle, other bell-crank levers carried by the side arms, connections between the bell-crank levers, and an operating mechanism, substantially as described.

2. In a potato-digger, the combination, with an axle, 10, of a gear mounted to slide thereon, side arms, 14, mounted on blocks 12, that are carried by the axle, a cage, 32, mounted between the arms 14, a shaft, 28, carrying blades 30 and 31, mounted within the cage, a bevel-gear carried by the shaft 28, a transverse shaft, 25, carrying a gear, 24, a bevel-gear, 26, bell-crank levers 47, bell-crank levers 46, connections between the bell-crank levers, a shaft, 45, carried by the bell-crank levers 46, a forwardly-extending frame carried by the axle 10 and resting upon the shaft 45, a means for rotating the shaft 45, a tongue, 40, hinged to the forwardly-extending frame, and a means, substantially as described, for raising or depressing the tongue, as and for the purpose stated.

3. In a potato-digger, the combination, with a revoluble cage and means for revolving the same from the main shaft, of side arms, 14, in which said cage is journaled, provided with segmental slots 13, in which the bearings of the main shaft are mounted, a frame pivoted on the axle, to which frame the tongue is attached, angle-levers 47, pivoted on the main shaft and connected to the arms 14, angle-levers 46, having one arm connected to the ends of the arms 14 and rigidly mounted on a shaft, 45, bars connecting the free arms of the levers 46 and 47, and a manipulating-lever, substantially as shown and described.

4. In a potato-digger, the combination, with a revoluble cage, of flanges 30, carried by the shaft of said cage, and flanges 31, extending at right angles to the flanges 30, substantially as shown and described.

ASA C. COLLINS.

Witnesses:
JOSEPH J. PTAK,
EDGAR COLLINS.